(12) United States Patent
Woodruff et al.

(10) Patent No.: US 7,752,101 B2
(45) Date of Patent: Jul. 6, 2010

(54) SYSTEM AND METHOD FOR INCREASING AN AMOUNT OF A SECURITY AVAILABLE FOR BORROW

(75) Inventors: Kevin G. Woodruff, New York, NY (US); Serkan Savasoglu, New York, NY (US); Nathan McMurtray, New York, NY (US); David Oakes, Dobbs Ferry, NY (US)

(73) Assignee: Morgan Stanley, New York, NY (US)

( * ) Notice: Subject to any disclaimer, the term of this patent is extended or adjusted under 35 U.S.C. 154(b) by 1317 days.

(21) Appl. No.: 10/689,135

(22) Filed: Oct. 20, 2003

(65) Prior Publication Data

US 2005/0086147 A1 Apr. 21, 2005

(51) Int. Cl.
*G06Q 99/00* (2006.01)
(52) U.S. Cl. .................................................. 705/35
(58) Field of Classification Search .............. 705/35–40
See application file for complete search history.

(56) References Cited

U.S. PATENT DOCUMENTS

| | | | | |
|---|---|---|---|---|
| 5,802,499 | A * | 9/1998 | Sampson et al. ............. | 705/35 |
| 6,188,993 | B1 | 2/2001 | Eng et al. | |
| 6,654,727 | B2 | 11/2003 | Tilton | |
| 2001/0037284 | A1* | 11/2001 | Finkelstein et al. ........... | 705/37 |
| 2002/0010670 | A1* | 1/2002 | Mosler et al. ................ | 705/37 |
| 2003/0009406 | A1* | 1/2003 | Ross ........................... | 705/36 |
| 2003/0033232 | A1* | 2/2003 | Sugahara ..................... | 705/36 |
| 2003/0074300 | A1* | 4/2003 | Norris ......................... | 705/37 |
| 2003/0182220 | A1* | 9/2003 | Galant ......................... | 705/36 |
| 2004/0030638 | A1* | 2/2004 | Dwin ........................... | 705/38 |
| 2004/0054613 | A1* | 3/2004 | Dokken ....................... | 705/36 |
| 2004/0177016 | A1* | 9/2004 | Jones et al. .................. | 705/35 |
| 2005/0044026 | A1* | 2/2005 | Leistner ...................... | 705/35 |
| 2009/0055302 | A1* | 2/2009 | Breen et al. .................. | 705/37 |

OTHER PUBLICATIONS

Monetizing unrealized gains in non-strategic assets, International Tax Review, London: Jun. 2000, p. 10.*
How to stay ahead in equity financing, Andrew Capon, International Securities Lending, London: Fourth Quarter 1998, p. 12.*
The Option to Repurchase Stock—includes appendix, Ikenberry, D., 1996.*
Good News and Bad News About Share Repurchases, Federal Reserve Board, Fenn, G., Liang, N., 1997.*
Optimal Investment with Stock Repurchase and Financing as Signals, Constantinides, G., Grundy, B., The Review of Financial Studies, 1989.*
S31, SEC S-3 Microsoft Sep. 16, 2003 with Exhibit (d)(1) Oct. 9, 2003.*
Using Exchange-Traded Equity Flex Put Options in Corporate Stock Repurchase Programs, Angel, J., Gastineau, G., Weber, C., Journal of Applied Corporate Finance, Spring 1997.*

* cited by examiner

*Primary Examiner*—Thu-Thao Havan
*Assistant Examiner*—Thomas M Hammond, III
(74) *Attorney, Agent, or Firm*—K&L Gates LLP (57) ABSTRACT

A method for increasing an amount of a security available to an investor for borrow is disclosed. The method includes purchasing a first quantity of a security, and entering into a pre-paid forward purchase contract to subsequently deliver a second quantity of the security to a first entity. The method also includes lending a third quantity of the security to an investor.

16 Claims, 3 Drawing Sheets

SYSTEM AND METHOD FOR INCREASING AN AMOUNT OF A SECURITY AVAILABLE FOR BORROW

BACKGROUND

This application is related, generally and in various embodiments, to financial transactions and, more particularly, to financial structures for increasing an amount of a security available for borrow.

Firms have traditionally issued conventional securities such as straight debt and common stock in order to raise capital. In general, straight debt securities (e.g., bonds, notes, loans, mortgages) enable entities to raise capital by borrowing and promising to repay a principal amount and interest on a specified future date or dates. Common stock securities, on the other hand, enable entities to raise capital by selling an equity interest in the entity.

In addition to conventional types of securities, firms also have a variety of more sophisticated hybrid investment instruments at their disposal. These hybrid securities often combine attributes of several different types of securities (e.g., debt components and equity components) and may change optionally or automatically at certain points in time or depending on market conditions. Convertible debt, for instance, provides the issuer and/or the holder with the option of exchanging the convertible debt for other securities, such as common stock. Convertible debt may be priced at a premium yet remain attractive to investors due to a mix of features such as, for example, earning interest like bonds when the stock price is down or flat and increasing in value like common stock when the stock price rises.

Many investors choose to purchase convertible debt as part of a larger investing strategy that seeks to isolate specific desirable risks such as, for example, changes in common stock volatility, from less-desirable risks such as, for example, changes in common stock prices or changes in an issuer's credit quality. These investors often implement their investment strategy by short-selling some amount of the issuer's common stock at the same time that they purchase the issuer's convertible debt. By short-selling common stock, the investor will profit if the common stock price declines. Conversely, the investor will lose value if the common stock price increases. Since convertible debt usually changes value in relation to changes in the price of the common stock into which it is convertible, an investor that owns convertible debt can determine an amount of common stock to short-sell such that in the aggregate, the investor is unaffected by price changes in the common stock. This occurs because if the common stock decreases in value, the corresponding decline in value of the convertible debt is offset by the investor's gain on the stock that was short-sold. Conversely, if the common stock increases in value, the corresponding increase in the value of the convertible debt offsets the investor's loss on the stock that was short-sold.

An investor that implements this investment strategy generally desires to remain unaffected by certain risks such as the risk that the common stock price will change, while remaining exposed to other risks that the investor accepts. For example, the investor may seek to profit on the investment through changes in the value of the debt component of the convertible debt resulting from falling interest rates. The investor may also seek to profit on the investment through changes in the value of the equity component of the convertible debt resulting from reduced dividends paid on the issuer's common stock or increases in the volatility of the issuer's common stock. Although the investor is hedged against risks the investor does not wish to assume, adverse changes in the selected risks that the investor accepts such as, for example, rising interest rates, could still result in a decrease in the value of the investment.

In order for an investor to engage in this strategy by short-selling common stock, it is necessary for the investor to have access to a sufficient quantity of borrowable common stock. This limitation exists because of the mechanics of short-selling common stock. To short-sell common stock an investor borrows common stock from another entity and sells the common stock in the market. When the investor decides to end the short-sale or if the entity the investor borrowed the common stock from asks that the common stock be returned, the investor repurchases common stock in the market to return the common stock that was borrowed from the entity. If the price at which the investor sold the common stock is greater than the price at which the investor repurchases the common stock, then the investor gains. Conversely, if the investor repurchases the common stock at a higher price than the price at which the investor originally sold the common stock, then the investor loses. However, if the investor cannot borrow common stock to sell initially, the investor cannot implement the short-sale transaction.

Whether common stock of an issuer is available for investors to borrow depends largely on whether entities that hold large amounts of the common stock choose to lend their common stock for this purpose. Typically the entity lending the common stock is paid a small amount to do so. This affords these entities some additional return on their common stock. The agreement to lend the common stock typically provides that the investor that borrows the common stock is required to repay to the lending entity any distributions such as, for example, dividends received on the common stock. Moreover, the loan agreement usually provides that the lending entity can demand that the shares be returned on a few days notice. Entities that wish to lend stock typically make the availability of their shares known to investment banks and broker-dealers so that investors can readily locate shares.

Despite the additional return that lending common stock provides, many entities choose not to lend out their common stock. In addition, other investors that believe an issuer's common stock price will decline may choose to invest on the basis of this belief by short-selling the common stock without hedging by purchasing convertible debt. These additional investors use up some of the common stock available to borrow. If an issuer has previously issued convertible debt, increases in its stock price will cause investors hedging the convertible debt to increase their positions in short-sold common stock. As a result, typically far less than the total amount of common stock issued by an entity is actually available at any given time to investors wishing to hedge the purchase of convertible debt. If the available common stock is particularly limited or concentrated among a few large entities, the entities may charge high prices to lend their common stock. These factors constrain not only the ability of investors to hedge their purchases of convertible debt, but also the ability of issuers to issue convertible debt in desired amounts since investors may be unwilling to purchase convertible debt without sufficient common stock available to borrow at reasonable prices. Even if investors are willing to purchase convertible debt from an issuer with limited common stock available to borrow, the investors may demand that the issuer sell the convertible debt at a lower price or on more favorable terms than if sufficient common stock were available to borrow.

One approach to making more common stock available to borrow is for an issuer to issue additional common stock until sufficient common stock is available for borrow by potential convertible investors. However, the resulting total amount of common stock issued may exceed the amount that common stock investors are willing to purchase at prices attractive to the issuer. In addition, an issuer that did so would also suffer dilution of its reported earnings per share. This occurs because current accounting rules calculate earnings per share by dividing the issuer's total earnings in a period by the total shares of common stock issued and outstanding, so increasing the amount of common stock issued decreases the earnings per share. The same effect occurs if the issuer merely lends, rather than sells, additional common stock to investors. Moreover, unless the additional common stock is directed to the convertible debt investors, more common stock than actually needed may have to be issued as only a portion of the additional common stock may be made available for borrow.

Accordingly, increasing the availability of common stock that investors can borrow may have significant financial implications for issuers and investors. Therefore, systems and methods for increasing the amount of an issuer's common stock available for convertible debt investors to borrow without diluting the issuer's earnings per share and by which the additional shares can be directed to investors that wish to hedge purchases of the issuer's convertible debt are needed.

SUMMARY

In one general respect, this application discloses embodiments of a method for increasing an amount of a security available to an investor for borrow, the security issued by a first entity. According to various embodiments, the method includes, by a second entity, purchasing a first quantity of the security, and entering into a forward purchase contract with the first entity. The forward purchase contract obligates the second entity to subsequently deliver a second quantity of the security to the first entity. The method also includes, by the second entity, lending a third quantity of the security to the investor. According to various embodiments, the method further includes, by the second entity, underwriting an issuance of a second security issued by the first entity.

In another general respect, this application discloses embodiments of a system for increasing an amount of a security available to an investor for borrow, the security issued by a first entity. According to various embodiments, the system includes a computing device for purchasing, on behalf of a second entity, a first quantity of the security as part of a transaction that includes a forward purchase contract that obligates the second entity to subsequently deliver a second quantity of the security to the first entity.

DETAILED DESCRIPTION

Figure 1:
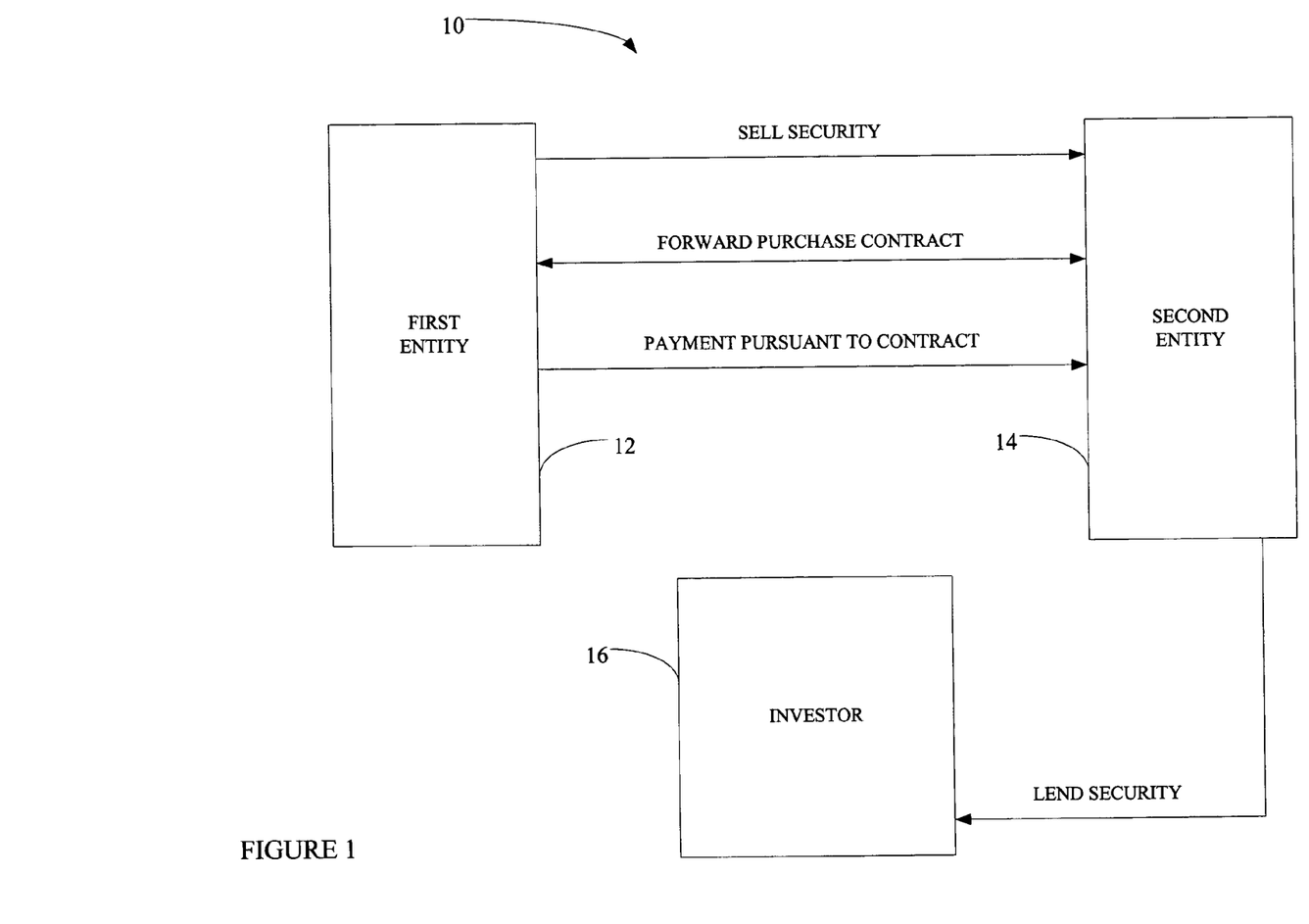
FIG. 1 is a diagram illustrating a transaction structure according to various embodiments.

FIG. 1 is a diagram illustrating a transaction structure 10 according to various embodiments of the disclosed invention. The transaction structure 10 may include transactions between a first entity 12, a second entity 14, and an investor 16.

The first entity 12 may be, for example, an issuer of securities. The securities issued by the first entity 12 may include, for example, common stock and convertible securities. The convertible securities may include, for example, convertible bonds and/or convertible preferred stock. The second entity 14 may be, for example, an investment bank, a broker-dealer, or any other entity capable of purchasing, selling and lending securities. The investor 16 may be, for example, an investor that purchases and borrows securities.

As shown in FIG. 1, the first entity 12 may sell a security such as, for example, common stock to the second entity 14. The second entity 14 may enter into a forward purchase contract with the first entity 12. The forward purchase contract may be a pre-paid forward purchase contract, and may obligate the second entity 14 to subsequently deliver the security to the first entity 12 by a settlement date specified in the forward purchase contract. The second entity 14 may also lend the security to the investor 16 such that the investor may short-sell the security. The second entity 14 may also serve as an underwriter for a second security issued by the first entity 12. The second security may be convertible securities such as, for example, convertible bonds and/or convertible preferred stock. The second entity 14 may sell the second security to the investor 16, or the investor 16 may purchase the second security from other sources. Although FIG. 1 illustrates the above-described transactions as occurring directly between the first entity 12, the second entity 14 and the investor 16, those of ordinary skill in the art will recognize that, according to other embodiments, any number of other entities may serve as intermediaries for the transactions between the first entity 12, the second entity 14 and the investor 16.

Figure 2:
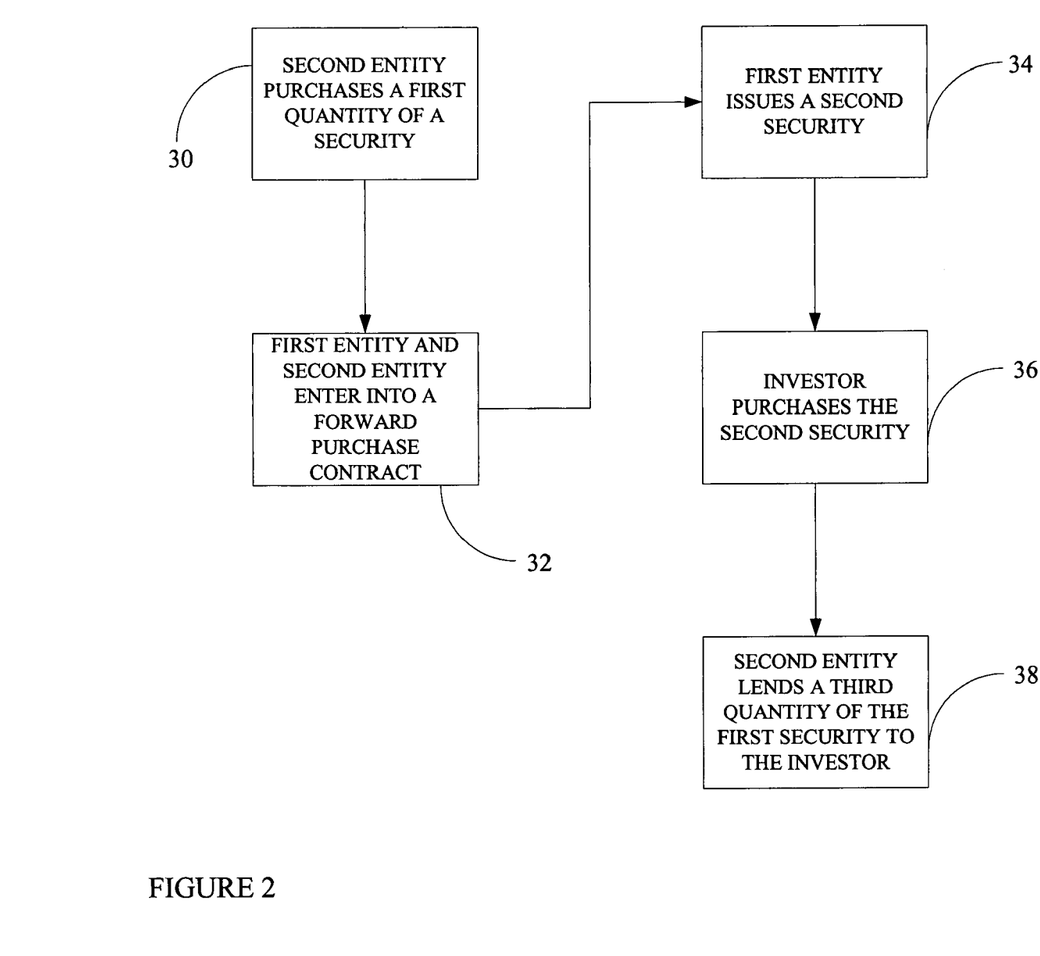
FIG. 2 illustrates a flowchart of a method for implementing the transaction structure of FIG. 1 according to various embodiments.

FIG. 2 illustrates a flowchart of a method for implementing the transaction structure 10 of FIG. 1 according to various embodiments. The process begins at block 30, where the second entity 14 purchases a first quantity of the security issued by the first entity 12. The second entity 14 may purchase the first quantity of the security from the first entity 12, from one or more intermediaries, or from any combination thereof. The first security purchased by the second entity 14 may be, for example, common stock, and may be purchased for a first price. The first price may be, for example, the market price.

From block 30, the process advances to block 32, where the first entity 12 and the second entity 14 enter into the forward purchase contract. The forward purchase contract may obligate the second entity 12 to subsequently deliver a second quantity of the security to the first entity 12 by a settlement date specified in the forward purchase contract. The security that the second entity 14 may be obligated to deliver to the first entity 12 may be, for example, common stock. The forward purchase contract may also obligate the second entity 14 to sell the second quantity of the security for a price that is, for example, the same as the price the second entity 14 paid for the security purchased at block 30. The forward purchase contract may also obligate the second entity 14 to subsequently deliver a quantity of the security to the first entity 12 that is the same, for example, as the quantity of the security purchased at block 30. However, the second quantity may be a different quantity, such as, the quantity originally purchased by the second entity 14 at block 30 increased by a quantity determined with reference to dividends paid on the security during the life of the forward purchase contract. The forward purchase contract may obligate the second entity 14 to deliver the second quantity of the security to the first entity 12, to one or more intermediaries, or to any combination thereof.

The forward purchase contract may be a pre-paid forward purchase contract that may obligate the first entity 12 to pay the second entity 14 a first payment when the forward purchase contract is entered into or before a settlement date of the forward purchase contract. The first payment paid by the first entity 12 to the second entity 14 may be equal to the sale price of the second quantity of the security specified in the forward purchase contract. The forward purchase contract may also obligate the second entity 14 to pay the first entity 12 a second amount equal to a total of any distributions such as, for example, dividends, paid on the security until a settlement date of the forward purchase contract. The second amount paid to the first entity 12 by the second entity 14 may comprise more than one payment, and the payments may be made periodically. In addition, the forward purchase contract may obligate the second entity 14 to pay the first entity 12 a third amount equal to a total of any amounts received for lending a third quantity of the security to the investor 16. The third amount paid to the first entity 12 by the second entity 14 may comprise more than one payment, and the payments may be made periodically. Thus, the forward purchase contract may obligate the second entity 14 to pay the first entity 12 an amount equal to a sum of a total of any distributions paid on the security until the settlement date of the forward purchase contract and a total of any payments the second entity 14 receives for lending the third quantity of the security to the investor 16. However, the forward purchase contract may not require payment for all or a portion of such amounts, or may permit any or all of these amounts to be paid by the second entity 14 by delivering additional quantities of the security on one or more dates during the life of the forward purchase contract.

The forward purchase contract may also obligate the first entity 12 and second entity 14 to fulfill the forward purchase contract by a settlement date that is defined by one of a maturity date of the second security issued by the first entity 12, a put date of the second security, or a call date of the second security. According to various embodiments, the settlement date may be the earliest of the maturity date of the second security, the put date of the second security and the call date of the second security. The second security may be, as previously stated, convertible debt such as, for example, a convertible bond or convertible preferred stock issued by the first entity 12. Although block 32 of FIG. 2 shows the forward purchase contract as being entered into after the second entity 14 purchases the security at block 30, the steps shown in blocks 30 and 32 may occur substantially simultaneously.

From block 32, the process advances to block 34, where the first entity 12 issues the second security. As stated hereinabove, one of the maturity date of the second security, the put date of the second security and the call date of the second security may coincide with the settlement date of the forward purchase contract. The second entity 14 may serve as the underwriter of the issuance of the second security. Although block 34 of FIG. 2 shows the issuance of the second security as occurring after block 32, the steps shown in blocks 30-34 may occur substantially simultaneously.

From block 34, the process advances to block 36, where the investor 16 purchases the second security. The investor 16 may purchase the second security from the first entity 12, the second entity 14, one or more intermediaries, or any combination thereof. Although block 36 of FIG. 2 shows the purchase of the second security as occurring after block 34, the steps shown in blocks 30-36 may occur substantially simultaneously.

From block 36, the process advances to block 38, where second entity 14 lends a third quantity of the security to the investor 16. According to various embodiments, the third quantity may be equal to the first quantity of the security purchased by the second entity 14, equal to the second quantity of the security to be subsequently delivered to the first entity 12, or equal to a quantity other than one of the first and second quantities. Although block 38 of FIG. 2 shows the lending of the security as occurring after block 36, the steps shown in blocks 30-38 may occur substantially simultaneously. For example, the second entity 14 may lend the third quantity of the security to the investor 16 when the first quantity of the security is purchased and the forward purchase contract is entered into, or shortly thereafter.

From the perspective of the first entity 12, the financial transaction structure 10 described above may replicate the economics of the first entity 12 lending the security directly to convertible debt investors, and may not negatively affect the first entity 12 since the forward purchase contract transaction may occur simultaneously with, concurrently with, or immediately after the purchase transaction. Thus, according to various embodiments, the payment received from the second entity 14 for the sale of the first quantity of the security may be offset by the payment made to the second entity 14 for the subsequent delivery of the second quantity of the security. As described hereinabove, the terms of the forward purchase contract may provide that until the settlement date, the second entity 14 may be obligated to pay the first entity 12 any amounts received for lending the security to an investor such as, for example, investor 16. The second entity 14 may also be obligated to pay any dividends paid on the security to the first entity 12. If instead of cash payments for dividend amounts, the second entity 14 increases the quantity of the security delivered to the first entity 12, the gain therefrom may be tax-free to the first entity 12, a substantial benefit compared to tax treatment if the first entity 12 had simply lent the security. Thus, the cash flows resulting from the financial transaction structure 10 above may replicate or improve upon (on an after-tax basis) the cash flows that would occur if the first entity 12 had simply lent the security directly to convertible debt investors without the involvement of the second entity 14.

However, the accounting treatment of the financial transaction structure 10 described above may be substantially different than if the first entity 12 had lent the security directly to convertible debt investors. For embodiments where the security is common stock, the sale of the common shares by the first entity 12 to the second entity 14 is accounted for as a sale of shares according to current financial accounting standards, thereby increasing the first entity's cash, equity and total common shares outstanding. By itself, this would result in a decrease in the first entity's earnings per share. However, under current financial accounting standards, the forward purchase contract is accounted for as a repurchase of shares, which decreases the first entity's cash, equity and total common shares outstanding. Moreover, these effects may take place at the time the forward purchase contract is entered into rather than at its settlement date. Since the amounts may be the same for both the sale and the repurchase, the net effect may be that the first entity's cash, equity and total common shares outstanding remain unchanged. As a result, the first entity's earnings per share may also be unchanged.

From the perspective of the investor 16, borrowing shares from the second entity 14 as provided by the financial transaction structure 10 described above is no different than borrowing shares in the ordinary manner.

Figure 3:
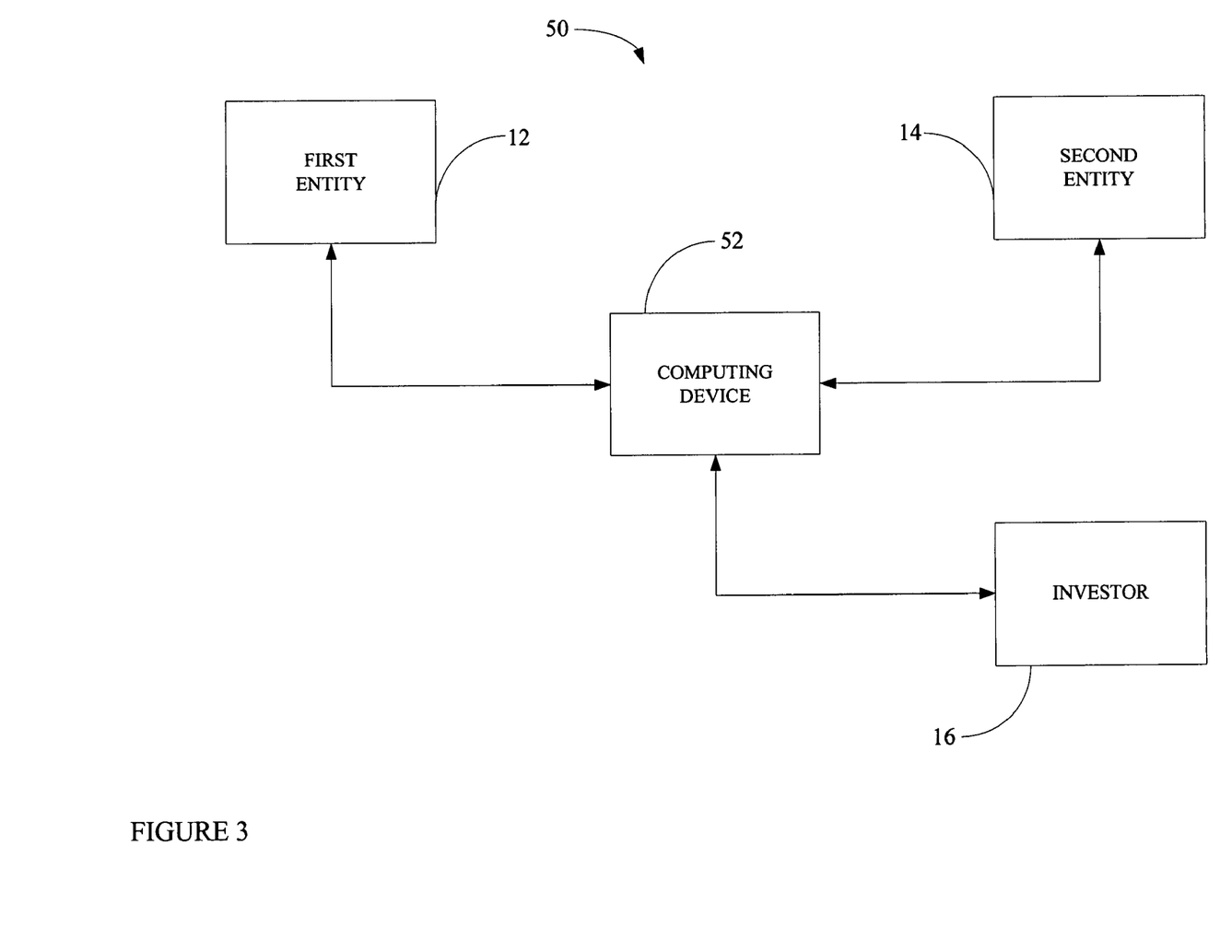
FIG. 3 illustrates a system for implementing the transaction structure of FIG. 1 according to various embodiments.

FIG. 3 illustrates a system 50 for implementing the transaction structure 10 of FIG. 1 according to various embodiments. The system 50 may include a computing device 52 for purchasing, on behalf of the second entity 14, the first quantity of the security as part of the transaction that includes the forward purchase contract that obligates the second entity 14 to subsequently deliver the second quantity of the security to the first entity 12. The computing device 52 may also be for electronically transferring funds between an account of the first entity 12 and an account of the second entity 14. For example, funds associated with the second entity's purchase of the first quantity of the security may be transferred from the account of the second entity 14 to the account of the first entity 12. Similarly, funds associated with the second entity's subsequent delivery of the second quantity of the security to the first entity may be transferred from the account of the first entity 12 to the account of the second entity 14. The computing device 52 may also be for lending, on behalf of the second entity 14, the third quantity of the security to the investor 14. The computing device 52 may further be for electronically transferring funds between an account of the investor 16 and the account of the second entity 14. For example, funds associated with the fee for lending the third quantity of the security to the investor 16 may be transferred from the account of the investor 16 to the account of the second entity 14. The computing device 52 may perform the above-described transactions automatically. Although the computing device 52 is shown as a single unit in FIG. 3 for purposes of convenience, it should be recognized that the computing device 52 may comprise a number of distributed computing devices, inside and/or outside the administrative domain.

In order to perform the transactions described hereinabove, the computing device 52 may execute a series of instructions. The instructions may be software code to be executed by the computing device 52. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, the steps illustrated in FIG. 2 may be performed in various orders. It is therefore intended to cover all such modifications, alterations and adaptations without departing from the scope and spirit of the disclosed invention as defined by the appended claims.

What is claimed is:

1. A computer-implemented method for increasing an amount of shares of common stock that are issued by a first entity available to an investor for borrowing, the method comprising:

underwriting, by a second entity, an issuance of a convertible security issued by the first entity;

purchasing, by a second entity from the first entity, through a computer system, a first quantity of the common stock of the first entity, wherein funds are electronically transferred from an account for the second entity to an account of the first entity for the purchase of the first quantity of the common stock by the computer system, wherein the computer system comprises at least one computer that executes a series of instructions stored on a computer readable medium that comprises at least one of a random access memory ("RAM") and a read only memory ("ROM");

entering into, by the second entity through the computer system, a forward purchase contract with the first entity, wherein the forward purchase contract obligates the second entity to subsequently deliver a second quantity of the common stock of the first entity to the first entity on a settlement date, wherein the settlement date coincides with a termination date of the convertible security issued by the first entity, wherein the settlement date occurs after a time when the second entity purchases the first quantity of the common stock of the first entity, wherein the first quantity is less than or equal to the second quantity, wherein the convertible security is different from the first entity's common stock, wherein the termination date of the convertible security is at least one of a maturity date of the convertible security, a call date of the convertible security, and a put date of the convertible security, wherein funds are electronically transferred from the account of the first entity to the account of the second entity pursuant to the forward purchase contract, wherein the reported earnings per share of the common stock of the first entity are not diluted because the second quantity of common stock is accounted for as a repurchase of the second quantity of common stock under the forward purchase contract; and lending, by the second entity though the computer system, a third quantity of the common stock issued by the first entity to the investor who purchases the convertible security, wherein funds are electronically transferred from an account of the investor to the account of the second entity for the lending of the third quantity of the first security to the investor, wherein lending the third quantity of the common stock to the investor occurs after or substantially simultaneously with (i) the issuance of the convertible security by the first entity, the purchase of the first quantity of the common stock by the second entity, and (iii) entering into the forward purchase contract between the second entity and the first entity, wherein the forward purchase contract comprises terms that obligate the second entity to pay the first entity until the settlement date of the forward purchase contract for (i) any amounts received by the second entity from lending the third quantity of the common stock to the investor and (ii) any dividends paid on the common stock.

2. The method of claim 1, wherein purchasing the first quantity of the common stock includes purchasing the first quantity of the common stock from the first entity.

3. The method of claim 1, wherein purchasing the first quantity of the common stock includes purchasing the first quantity of the common stock from an intermediary.

4. The method of claim 1, wherein purchasing the first quantity of the common stock includes purchasing the first quantity of the common stock for a first price, and wherein entering into the forward purchase contract includes obligating the second entity to subsequently deliver the second quantity of the common stock to the first entity for the first price.

5. The method of claim 1, wherein the forward purchase contract obligates the second entity to subsequently deliver a quantity of the common stock equal to the first quantity to the first entity.

6. The method of claim 1, wherein entering into the forward purchase contract includes entering into the forward purchase contract when the first quantity of the common stock is purchased.

7. The method of claim 1, wherein entering into the forward purchase contract includes the second entity receiving a first payment before a settlement date of the forward purchase contract.

8. The method of claim 7, wherein the second entity receiving the first payment includes the second entity receiving the first payment when the forward purchase contract is entered into.

9. The method of claim 8, wherein the second entity receiving the first payment includes the second entity receiving a payment equal to a sale price of the second quantity of the common stock.

10. The method of claim 1, wherein the forward purchase contract permits the second entity to pay the first entity until the settlement date of the forward purchase contract with stock.

11. The method of claim 1, wherein the forward purchase contract obligates the second entity to fulfill the forward purchase contract by a settlement date that is one of a maturity date of the convertible security issued by the first entity, a put date of the convertible security and a call date of the convertible security.

12. The method of claim 1, wherein lending the third quantity of the common stock to the investor includes lending at least one of the first and second quantities of the common stock to the investor.

13. The method of claim 1, wherein the convertible security comprises a convertible security selected from the group comprising a convertible bond security and a convertible preferred stock security.

14. A computer-implemented method for increasing an amount of shares of common stock that are issued by a first entity available to an investor for borrowing, the method comprising:
    underwriting, by a second entity, an issuance of a convertible security issued by the first entity;
    purchasing, by a second entity from the first entity, through a computer system, a first quantity of the common stock of the first entity, wherein funds are electronically transferred from an account for the second entity to an account of the first entity for the purchase of the first quantity of the common stock by the computer system, wherein the computer system comprises at least one computer that executes a series of instructions stored on a computer readable medium that comprises at least one of a random access memory ("RAM") and a read only memory ("ROM");
    entering into, by the second entity through the computer system, a forward purchase contract with the first entity, wherein the forward purchase contract obligates the second entity to subsequently deliver a second quantity of the common stock of the first entity to the first entity on a settlement date, wherein the settlement date coincides with a termination date of the convertible security issued by the first entity, wherein the settlement date occurs after a time when the second entity purchases the first quantity of the common stock of the first entity, wherein the first quantity is less than or equal to the second quantity, wherein the convertible security is different from the first entity's common stock, wherein the termination date of the convertible security is a maturity date of the convertible security, wherein funds are electronically transferred from the account of the first entity to the account of the second entity pursuant to the forward purchase contract, wherein the reported earnings per share of the common stock of the first entity are not diluted because the second quantity of common stock is accounted for as a repurchase of the second quantity of common stock under the forward purchase contract; and
    lending, by the second entity through the computer system, a third quantity of the common stock issued by the first entity to the investor who purchases the convertible security, wherein funds are electronically transferred from an account of the investor to the account of the second entity for the lending of the third quantity of the first security to the investor, wherein lending the third quantity of the common stock to the investor occurs after or substantially simultaneously with (i) the issuance of the convertible security by the first entity, the purchase of the first quantity of the common stock by the second entity, and (iii) entering into the forward purchase contract between the second entity and the first entity,
    wherein the forward purchase contract comprises terms that obligate the second entity to pay the first entity until the settlement date of the forward purchase contract for (i) any amounts received by the second entity from lending the third quantity of the common stock to the investor and (ii) any dividends paid on the common stock.

15. A computer-implemented method for increasing an amount of shares of common stock that are issued by a first entity available to an investor for borrowing, the method comprising:
    underwriting, by a second entity, an issuance of a convertible security issued by the first entity;
    purchasing, by a second entity from the first entity, through a computer system, a first quantity of the common stock of the first entity, wherein funds are electronically transferred from an account for the second entity to an account of the first entity for the purchase of the first quantity of the common stock by the computer system, wherein the computer system comprises at least one computer that executes a series of instructions stored on a computer readable medium that comprises at least one of a random access memory ("RAM") and a read only memory ("ROM");
    entering into, by the second entity through the computer system, a forward purchase contract with the first entity, wherein the forward purchase contract obligates the second entity to subsequently deliver a second quantity of the common stock of the first entity to the first entity on a settlement date, wherein the settlement date coincides with a termination date of the convertible security issued by the first entity, wherein the settlement date occurs after a time when the second entity purchases the first quantity of the common stock of the first entity, wherein the first quantity is less than or equal to the second quantity, wherein the convertible security is different from the first entity's common stock, wherein the termination date of the convertible security is a put date of the convertible security, wherein funds are electronically transferred from the account of the first entity to the account of the second entity pursuant to the forward purchase contract, wherein the reported earnings per share of the common stock of the first entity are not diluted because the second quantity of common stock is accounted for as a repurchase of the second quantity of common stock under the forward purchase contract; and
    lending, by the second entity through the computer system, a third quantity of the common stock issued by the first entity to the investor who purchases the convertible security, wherein funds are electronically transferred from an account of the investor to the account of the second entity for the lending of the third quantity of the first security to the investor, wherein lending the third quantity of the common stock to the investor occurs after or substantially simultaneously with (i) the issuance of the convertible security by the first entity, the purchase of the first quantity of the common stock by the second entity, and (iii) entering into the forward purchase contract between the second entity and the first entity, wherein the forward purchase contract comprises terms that obligate the second entity to pay the first entity until the settlement date of the forward purchase contract for (i) any amounts received by the second entity from lending the third quantity of the common stock to the investor and (ii) any dividends paid on the common stock.

16. A computer-implemented method for increasing an amount of shares of common stock that are issued by a first entity available to an investor for borrowing, the method comprising:

underwriting, by a second entity, an issuance of a convertible security issued by the first entity;

purchasing, by a second entity from the first entity, through a computer system, a first quantity of the common stock of the first entity, wherein funds are electronically transferred from an account for the second entity to an account of the first entity for the purchase of the first quantity of the common stock by the computer system, wherein the computer system comprises at least one computer that executes a series of instructions stored on a computer readable medium that comprises at least one of a random access memory ("RAM") and a read only memory ("ROM");

entering into, by the second entity through the computer system, a forward purchase contract with the first entity, wherein the forward purchase contract obligates the second entity to subsequently deliver a second quantity of the common stock of the first entity to the first entity on a settlement date, wherein the settlement date coincides with a termination date of the convertible security issued by the first entity, wherein the settlement date occurs after a time when the second entity purchases the first quantity of the common stock of the first entity, wherein the first quantity is less than or equal to the second quantity, wherein the convertible security is different from the first entity's common stock, wherein the termination date of the convertible security is a call date of the convertible security, wherein funds are electronically transferred from the account of the first entity to the account of the second entity pursuant to the forward purchase contract, wherein the reported earnings per share of the common stock of the first entity are not diluted because the second quantity of common stock is accounted for as a repurchase of the second quantity of common stock under the forward purchase contract; and lending, by the second entity through the computer system, a third quantity of the common stock issued by the first entity to the investor who purchases the convertible security, wherein funds are electronically transferred from an account of the investor to the account of the second entity for the lending of the third quantity of the first security to the investor, wherein lending the third quantity of the common stock to the investor occurs after or substantially simultaneously with (i) the issuance of the convertible security by the first entity, the purchase of the first quantity of the common stock by the second entity, and (iii) entering into the forward purchase contract between the second entity and the first entity, wherein the forward purchase contract comprises terms that obligate the second entity to pay the first entity until the settlement date of the forward purchase contract for (i) any amounts received by the second entity from lending the third quantity of the common stock to the investor and (ii) any dividends paid on the common stock.

* * * * *

UNITED STATES PATENT AND TRADEMARK OFFICE
CERTIFICATE OF CORRECTION

| | | |
|---|---|---|
| PATENT NO. | : 7,752,101 B2 | Page 1 of 1 |
| APPLICATION NO. | : 10/689135 | |
| DATED | : July 6, 2010 | |
| INVENTOR(S) | : Kevin G. Woodruff et al. | |

It is certified that error appears in the above-identified patent and that said Letters Patent is hereby corrected as shown below:

Column 8, line 25, delete "though" and substitute --through--

Column 8, line 36, delete "(iii)" and substitute --(ii)--

Column 10, line 10, delete "(iii)" and substitute --(ii)--

Column 11, line 1, delete "(iii)" and substitute --(ii)--

Column 12, line 25, delete "(iii)" and substitute --(ii)--

Signed and Sealed this

Twenty-eighth Day of December, 2010

David J. Kappos
*Director of the United States Patent and Trademark Office*